United States Patent
Ekenhorst

(10) Patent No.: US 9,302,453 B2
(45) Date of Patent: Apr. 5, 2016

(54) COMPOSITE FILM, METHOD FOR PRODUCING A COMPOSITE FILM AND A FILM COMPOSITE CONSISTING OF AT LEAST ONE COMPOSITE FILM, AND APPARATUS FOR PRODUCING A COMPOSITE FILM

(75) Inventor: Dirk Ekenhorst, Osnabrück (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 13/810,338

(22) PCT Filed: Jun. 1, 2011

(86) PCT No.: PCT/EP2011/059032
§ 371 (c)(1),
(2), (4) Date: Jan. 15, 2013

(87) PCT Pub. No.: WO2012/007223
PCT Pub. Date: Jan. 19, 2012

(65) Prior Publication Data
US 2013/0115414 A1      May 9, 2013

(30) Foreign Application Priority Data
Jul. 15, 2010   (DE) .................. 10 2010 031 362

(51) Int. Cl.
*B32B 27/08*    (2006.01)
*B32B 27/32*    (2006.01)
(Continued)

(52) U.S. Cl.
CPC . *B32B 27/08* (2013.01); *B26F 1/26* (2013.01); *B29C 65/02* (2013.01);
(Continued)

(58) Field of Classification Search
None
See application file for complete search history.

(56) References Cited

U.S. PATENT DOCUMENTS 2,899,347 A * 8/1959 Kindseth ............. 156/209
3,707,102 A * 12/1972 Huppenthal et al. ....... 83/171
(Continued)

FOREIGN PATENT DOCUMENTS

DE   2337560      2/1974
DE   102008043441  5/2010
(Continued)

OTHER PUBLICATIONS

"Technical Product Data Sheets—PET (polyethylene terephthalate". Polymer Products, Inc.; Aug. 4, 2001; <http://www.plastic-products.com/part12.htm>.*
(Continued)

*Primary Examiner* — David Sample
*Assistant Examiner* — Donald M Flores, Jr.
(74) *Attorney, Agent, or Firm* — Michael Best & Friedrich LLP

(57) ABSTRACT

The invention relates to a composite film (10), in particular for packaging (1) in the food industry, having at least one sealing layer (12), which consists of sealable material and is connected, at least indirectly, to a first layer (11) which acts as an outer layer, wherein the sealing layer (12) has a lower melting point than the first layer (11). According to the invention, it is provided that, on that side of the sealing layer (12) which is directed away from the first layer (11), a second layer (13), which acts as an inner layer, is arranged in operative connection with the sealing layer (12), that the second layer (13) has a higher melting point than the sealing layer (12), and that the second layer (13) has at least one through-opening (17; 17a to 17c), which is covered over by the sealing layer (12).

7 Claims, 2 Drawing Sheets

(51) Int. Cl.
| | |
|---|---|
| *B32B 3/26* | (2006.01) |
| *B32B 7/08* | (2006.01) |
| *B26F 1/26* | (2006.01) |
| *B29C 65/02* | (2006.01) |
| *B29C 65/00* | (2006.01) |
| *B31F 5/02* | (2006.01) |
| *B32B 7/02* | (2006.01) |
| *B32B 27/34* | (2006.01) |
| *B32B 27/36* | (2006.01) |
| *B32B 3/06* | (2006.01) |
| *B26F 1/02* | (2006.01) |
| *B29L 31/00* | (2006.01) |

(52) U.S. Cl.
CPC .......... *B29C 66/1122* (2013.01); *B29C 66/133* (2013.01); *B29C 66/21* (2013.01); *B29C 66/223* (2013.01); *B29C 66/304* (2013.01); *B29C 66/43* (2013.01); *B29C 66/431* (2013.01); *B29C 66/432* (2013.01); *B29C 66/71* (2013.01); *B29C 66/723* (2013.01); *B29C 66/73921* (2013.01); *B29C 66/8511* (2013.01); *B31F 5/027* (2013.01); *B32B 3/06* (2013.01); *B32B 3/266* (2013.01); *B32B 7/02* (2013.01); *B32B 7/08* (2013.01); *B32B 27/32* (2013.01); *B32B 27/322* (2013.01); *B32B 27/34* (2013.01); *B32B 27/36* (2013.01); *B26F 1/02* (2013.01); *B29C 66/7352* (2013.01); *B29C 2793/0045* (2013.01); *B29C 2793/0081* (2013.01); *B29L 2031/737* (2013.01); *B31B 2219/603* (2013.01); *B31B 2219/6084* (2013.01); *B32B 2307/31* (2013.01); *B32B 2439/46* (2013.01); *B32B 2439/70* (2013.01); *Y10T 83/929* (2015.04); *Y10T 156/1051* (2015.01); *Y10T 428/24215* (2015.01); *Y10T 428/24331* (2015.01)

(56) References Cited

U.S. PATENT DOCUMENTS

| | | | | |
|---|---|---|---|---|
| 4,429,810 | A | * | 2/1984 | Hampel et al. ................ 222/107 |
| 4,564,541 | A | * | 1/1986 | Taira et al. .................... 428/35.4 |
| 4,596,833 | A | * | 6/1986 | Endo et al. ....................... 521/60 |
| 4,724,961 | A | * | 2/1988 | Shimoyamada et al. ..... 206/439 |
| 4,911,963 | A | * | 3/1990 | Lustig et al. ................. 428/36.91 |
| 4,935,271 | A | | 6/1990 | Schirmer |
| 5,141,795 | A | * | 8/1992 | Kai et al. ....................... 428/138 |
| 5,215,380 | A | * | 6/1993 | Custer et al. ................... 383/203 |
| 5,296,291 | A | | 3/1994 | Mueller |
| 5,759,145 | A | | 6/1998 | Kagawa |
| 6,427,420 | B1 | | 8/2002 | Olivieri et al. |
| 2001/0049001 | A1 | | 12/2001 | Mueller |
| 2002/0081405 | A1 | * | 6/2002 | Marbler et al. ............... 428/35.2 |
| 2004/0028851 | A1 | | 2/2004 | Okhai |

FOREIGN PATENT DOCUMENTS

| | | |
|---|---|---|
| EP | 0307194 | 3/1989 |
| EP | 1834762 | 9/2007 |
| JP | 5063080 | 5/1975 |
| JP | H07256807 | 10/1995 |

OTHER PUBLICATIONS

"Poly(ethylene terephthalate)". PolymerProcessing.com; Apr. 24, 2001; <http://www.polymerprocessing.com/polymers/PET.html>.*

AUS-e-TUTE, "Polythene (polyethylene): Properties, Production & Uses". AUS-E-TUTE; Jun. 15, 2002; <http://asusetute.com.au/polythen.html>.*

PCT/EP2011/059032 International Search Report dated Aug. 8, 2011 (Translation and Original, 6 pages).

* cited by examiner

COMPOSITE FILM, METHOD FOR PRODUCING A COMPOSITE FILM AND A FILM COMPOSITE CONSISTING OF AT LEAST ONE COMPOSITE FILM, AND APPARATUS FOR PRODUCING A COMPOSITE FILM

BACKGROUND OF THE INVENTION

The invention relates to a composite film, a method for producing a composite film as well as a method for producing a film composite consisting of at least one composite film. The invention further relates to an apparatus for producing a composite film.

A composite film of this kind is particularly known from the food or nutriment industry and hereby serves to produce packaging which in each case contains a certain quantity of food or nutriments. Such composite films are particularly known in the production of so-called tubular bag packages. Such tubular bag packages are produced by two opposing peripheral regions of a composite film, or even two separate composite films, being laid against each another, wherein the peripheral regions on the sealing layers of the composite film, which are laid against each other, weld with one another while being subjected to heat and pressure. The composite films thereby consist of a plurality of layers which are connected to one another and have different melting points. During the sealing process, the film layers having the lowest melting point melt initially. It is therefore customary when welding composite films on the inner side of the package for those layers having the lowest melting point to be disposed as the sealing layers.

Due to economic considerations, a sealing layer, which simultaneously forms the inner layer of the packaging is in this case worth considering, in particular polyethylene (PE). Other plastics having a higher melting point with respect to PE as, for example, polyamide (PA) or polyethylene terephthalate (PET), are not used as the sealing layer because these polymers have too high a melting point so that they can not be economically welded in the packaging field or the strength of the weld seam is not sufficient. In addition, the use of such plastics as PA or PET on the inner side of the package is not possible when plastics having a lower melting point in comparison thereto are simultaneously used. This is the case because the layer having the lower melting point would initially melt without melting of the layer on the inside of the package having the higher melting point in relation to the aforementioned layer occurring.

It should be additionally mentioned that the use of polyethylene (PE) in particular as the innermost packaging material layer, which in turn has contact with a bulk material, is not suitable as packaging for sensitive food as, for example, mineral water, due to the high migration capability thereof.

SUMMARY OF THE INVENTION

On the basis of the prior art, the task underlying the invention is to further develop a composite film, a method for producing a composite film as well as method for producing a film composite consisting of at least one composite film according to the preambles of the respective independent claims such that materials can be used as inner layers of the packaging, which do not necessarily have to have the lowest melting point with respect to the different layers. The use of alternative polymers instead of polyethylene should thereby be particularly made possible. This aim is met by a composite film according to the invention.

The invention is based on the idea of using a material, in particular polyethylene therephthalate, having with respect to the firstly melting (sealing) layer a higher melting point relative thereto as the inner layer which has contact to a bulk material, wherein said inner layer has at least one through-opening, which is covered by a sealing layer having a lower melting point relative thereto. The leak-tight connection in the region of the sealing or the weld seam is also particularly thereby achieved in that when melting the sealing layer, the material of the sealing layer penetrates through the through-opening of the PET inner layer and comes into operative connection with the opposing sealing layer. At the same time and depending on the welding parameters and the sealing tool, the through-openings in the innermost layer break open under the influence of the pressure of the sealing jaws; and therefore a preferably, in particular lineary, connection zone covering the whole surface is achieved in the region of the through-openings.

Advantageous modifications to the composite film according to the invention, to the method for producing the composite film as well as to the method for producing a film composite consisting of at least one composite film are specified in the respective dependent claims. All combinations from at least two of the features disclosed in the claims, the description and/or the figures fall within the scope of the invention.

The use of PET as the inner layer, in particular for packages, has the advantage that in the case of sensitive foods as, for example, water, a composite film of this kind is suitable for packaging sensitive food of this kind due to the very low migration capability of PET.

It is particularly preferred if at least one third layer acting as a barrier layer is arranged between the sealing layer and the first layer. Such a barrier layer can, for example, prevent the entry of UV radiation into a packaging and thus increase the shelf life of the nutriment or food item.

It is especially preferred if a plurality of through-openings are configured in the second layer, said through-openings being arranged evenly spaced in relation to each other. By means of this configuration, a composite film, in particular as a continuous packaging material web, according to the invention can be stockpiled and particularly easily processed.

Particularly in the forming of leak-proof tubular bag packages, in which the discharge of particularly liquid or pasty bulk material has to be reliably prevented, provision is furthermore made in a particularly preferred embodiment of the invention for at least two rows of through-openings to be provided, for a strip-like zone without through-openings to be configured between the rows and for the two rows of through-openings to be aligned relative to each other in such a way that when the composite film is folded over in the region of the strip-like zone and when the two sections are laid against each other to form a folded edge, the through-openings of the two second layers laid against each other are arranged in an overlapping manner relative to one another.

Satisfactory results with regard to the properties of the packaging of tubular bags are achieved if the sealing layer consists of polyethylene (PE) and has a layer thickness of 30 µm to 100 µm, preferably between 50 µm and 90 µm, and if the second layer has a thickness of 8 µm to 20 µm, preferably between 12 µm and 18 µm.

BRIEF DESCRIPTION OF THE DRAWINGS

Further advantages, features and details of the invention ensue from the following description of preferred exemplary embodiments as well as from the drawings.

Said drawings show in.

DETAILED DESCRIPTION

Figure 1:
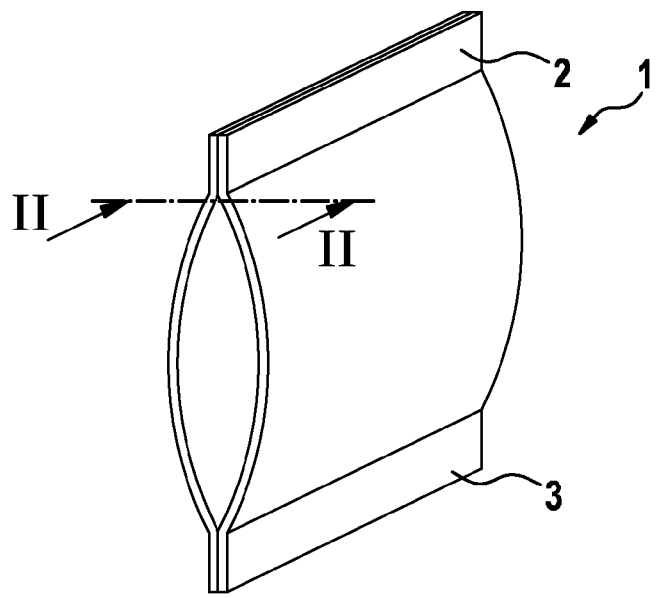
FIG. 1 a package designed as a tubular bag for food or nutriments in a perspective view.

In FIG. 1, a packaging 1 is depicted which can particularly be used in the food or nutriment industry. The packaging 1 hereby serves particularly for the packaging of liquid, pasty or lumpy bulk material as, for example, milk, water or ketchup or the like.

The use of the composite film for packaging of sensory sensitive food as, for example, water is particularly preferred.

The packaging 1 is designed cushion-like in the exemplary embodiment and particularly has an upper strip-like weld seam 2 and a lower likewise strip-like weld seam 3. Such a packaging 1 is typically produced by means of so-called tubular bag machines in which at least one composite film stored as a continuous packaging material web is cyclically or continuously removed, folded, filled and welded. In so doing, tubular bag machines of this kind work either with a single packaging material web, wherein the two end regions, which are spaced in the longitudinal direction with respect to the preferential direction, are laid against each other, or else with two separate packaging material webs which are brought into superposition. In both cases, further so-called longitudinal weld seams—not depicted in the illustration of FIG. 1—are therefore required It deserves to be additionally mentioned that instead of the cushion-like packaging 1, packaging 1 shaped differently also, of course, falls within the scope of the invention. Such packaging 1, for example in the shape of standard bag packages, pyramid-like packages etc. can be provided or used. It is only essential that all such packaging 1 has weld seams 2, 3.

The production of weld seams 2 and 3 takes place by so-called sealing tools known from prior art. Said sealing tools comprise sealing jaws, between which the two opposing sections of the at least one packaging material web are welded together while being subjected to heat and pressure.

Figure 3:
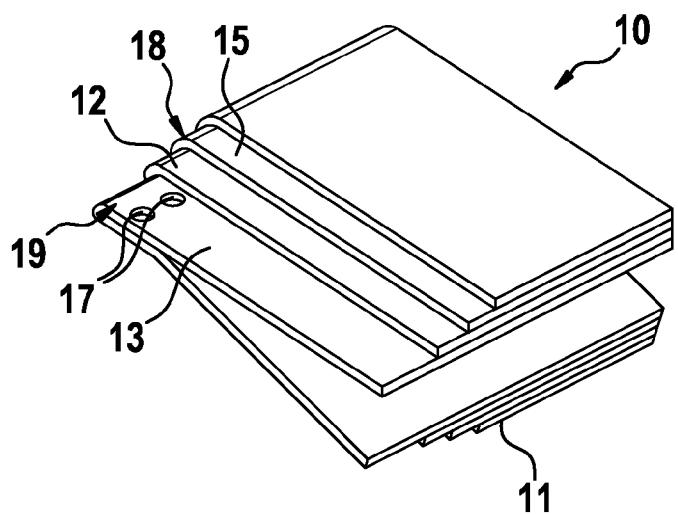
FIG. 3 a perspective view of a composite film with the different layers thereof for use in a package according to FIG. 1 in a peripheral region, which is connected by means of a weld seam, FIG. 4 the depiction in perspective view of a part of the composite film pursuant to FIG. 3 in the region of the sealing and inner layer thereof and FIG. 5 a simplified depiction of a device for producing through-openings on a PET inner layer.

The packaging 1 is produced using an inventive composite film 10 depicted in FIG. 3, which represents the packaging material web mentioned above. The composite film 10 is comprised of at least three different layers 11 to 13. Polyethylene therephthalate (PET) is preferably but not necessarily used as the outer layer 11 of the packaging 1 which represents a first layer 11. As an alternative thereto, the use of polyamide (PA) is, for example, also conceivable. A second layer as sealing layer 12, which consists particularly of polyethylene (PE) adjoins the first (outer) layer 11. The outer layer 11 has a higher melting point than the sealing layer 12. A second layer 13 acting as the inner layer 13 in turn adjoins the sealing layer 12 on the side which is opposite to the outer layer 11. The inner layer 13 hereby consists of particularly likewise polyethylene therephthalate (PET). In this case, it is essential for the sealing layer 12 to have a lower melting point than the inner layer 13.

In practice, satisfactory results for packaging 1 were achieved if the layer thickness of the sealing layer 12 is between 30 µm and 100 µm, preferably between 50 µm and 90 µm, and wherein the inner layer 13 has a layer thickness from 8 µm to 20 µm, preferably between 12 µm and 18 µm.

Provision can also particularly be made for at least one additional barrier layer 15 to be arranged between the outer layer 11 and the sealing layer 13, as can be seen with the aid of FIG. 3. All conventional barrier layers 15 in composite films are worthy of consideration as material for the barrier layer 15. The composite film can also overall consist of a plurality of layers connected to one another. It is only essential that the inner layer 13, which is in contact with the food, has a higher melting point than the sealing layer 12 which is working in conjunction with said inner layer.

Figure 4:
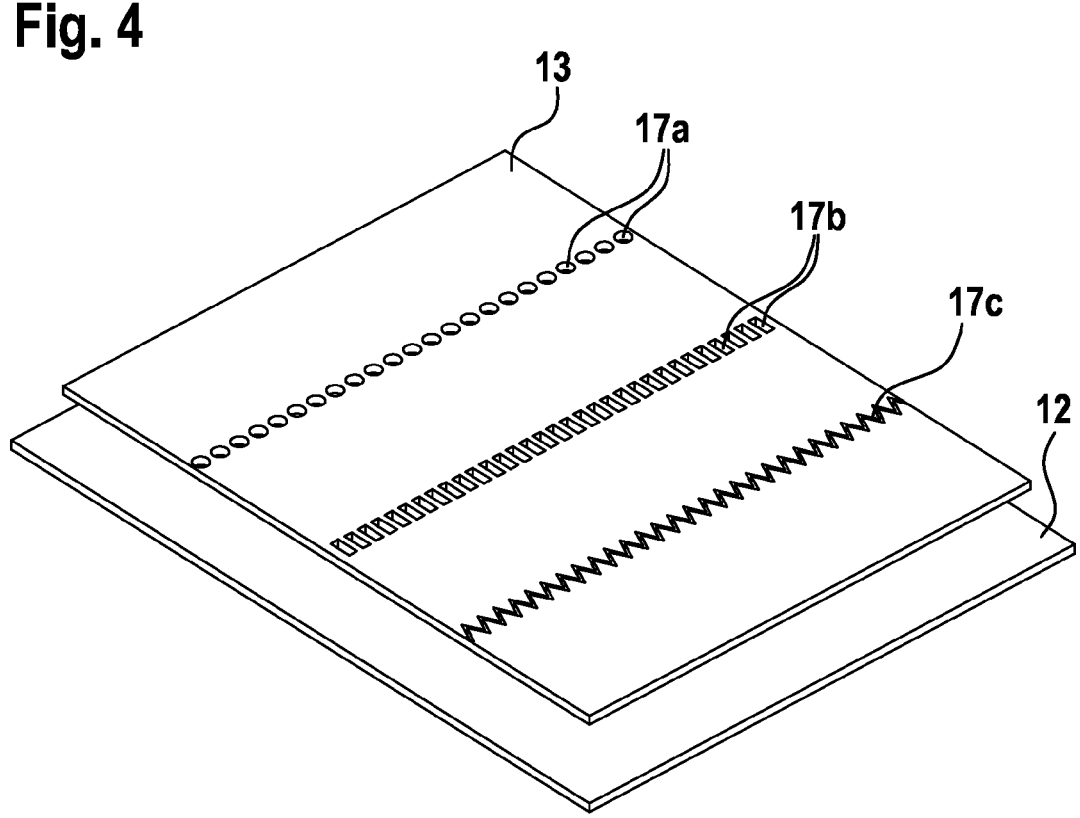
Figure 5:
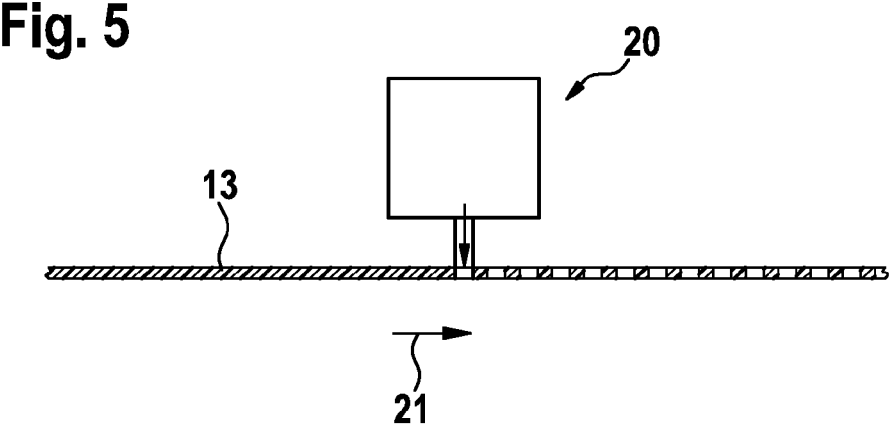

It is essential to the invention that the inner layer 13 is configured having at least one perforation or at least one through-opening 17. In FIG. 4, three different forms of through-openings 17 are depicted by way of example. The through-openings 17a are thus designed as round through-openings 17a, whereas the through openings 17b have a rectangular cross section. The through-opening 17c is designed as a zigzag pattern. When using the through-openings 17a and 17b, said through-openings are particularly arranged or designed as a plurality of through-openings arranged adjacently or one behind the other.

When forming the packaging 1 using the inventive composite film 10, it is essential that in accordance with FIG. 3 (the case is depicted here, in which a single composite film 10 is used) said film is folded in the region of an edge 18 such that the through-openings 17 of the opposing sections of the inner layer 13 are arranged in alignment with one another. Between said through-openings 17 and the edge 18, a zone 19 is formed in which no through-openings 17 are configured.

In the exemplary embodiment shown in FIG. 3, only one region, which has two rows of through-openings 17 arranged in alignment, is depicted. Of course, it is also within the scope of the invention to arrange a plurality of such rows of through-openings parallel to the edge 18.

Figure 2:
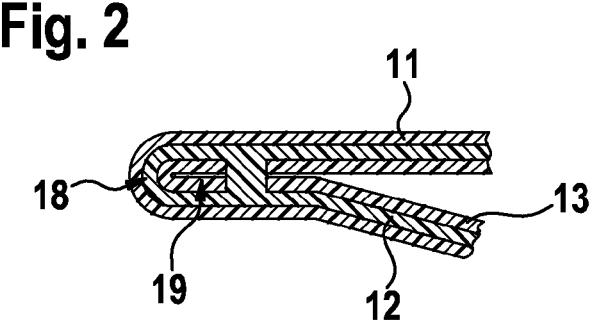
FIG. 2 a cross-section in the plane II-II of FIG. 1.

When forming the weld seams 2, 3 in the region of the through-openings 17, heat and pressure are introduced in the region of the weld seam 2 or 3 by means of the previously mentioned sealing or respectively welding tool. In so doing, the sealing layer 12 is melted according to the depiction of FIG. 2 such that material moves out of said sealing layer 12 through the through-opening and joins with material of the sealing layer 12 on the opposite side and thereby a permanent bond is formed.

The through-openings 17 are furthermore broken open or widened as a function of the welding parameters and the design of the sealing tool such that a strip-like connection zone is preferably formed, in which the two sealing layers 12 form a tight connection over the whole surface; and therefore, as the case may be, the composite film 10 does not have to be folded back to form an edge 18.

A device 20 for producing through-openings 17 in the inner layer 13 is depicted in a greatly simplified manner, said inner layer being part of an apparatus (not shown). In this case, the inner layer 13 is moved along in accordance with the arrow 21 cyclically or continuously beneath the device 20, wherein said device 20 forms the through-openings in the inner layer 13. A laser beam device, a punching device or a device 20 comprising at least one knife are particularly worthy of consideration for being said device 20. The inner layer 13 configured in this manner is subsequently connected in a known manner per se by means of the apparatus to the outer layer 11, the sealing layer 12 as well as, if applicable, to the barrier layer 15, wherein the sealing layer 12 covers at least the region of the through-openings. Other devices 20 are also conceivable. The through-openings 17 can, for example, be subsequently formed by means of a laser device in an already finished composite film 10; and if need be additional weak areas are thereby formed on the composite film, for example for the simplified mounting of a spout or for the simplified use of the same.

What is claimed is:

1. A composite film (10), having at least one sealing layer (12), which consists of sealable material and is connected, at least indirectly, to a first layer (11) which acts as an outer layer, wherein the sealing layer (12) has a lower melting point than the first layer (11), wherein on that side of the sealing layer (12) which is directed away from the first layer (11), a second layer (13), which acts as an inner layer, is arranged in operative connection with said sealing layer (12), in that the second layer (13) has a higher melting point than said sealing layer (12), wherein a plurality of through-openings (17; 17a to 17c) is configured in the second layer (13), the through-openings being arranged evenly spaced in relation to each other, wherein at least two rows of through-openings (17, 17a to 17c) are provided, in that a strip-like zone (19) without any through-openings (17; 17a to 17c) is formed between the rows, the composite film (10) forming a folding edge such that the through-openings (17; 17a to 17c) of the second layer (13) laid against each other are arranged relative to one another in an overlapping manner and aligned, and wherein said second layer (13) has at least one through-opening (17; 17a to 17c) which is covered over by said sealing layer (12).

2. The composite film according to claim 1, characterized in that the second layer (13) consists of polyethylene terephthalate (PET).

3. The composite film according to claim 1, characterized in that at least one third layer (15) acting as a barrier layer is arranged between the sealing layer (12) and the first layer (11).

4. The composite film according to claim 1, characterized in that the sealing layer (12) consists of polyethylene (PE) and has a layer thickness of 30 µm to 100 µm, and in that the second layer (13) has a thickness of 8 µm to 20 µm.

5. The composite film according to claim 1, characterized in that the sealing layer (12) consists of polyethylene (PE) and has a layer thickness of between 50 µm and 90 µm and in that the second layer (13) has a thickness of between 12 µm and 18 µm.

6. The composite film according to claim 1, wherein the sealing layer joins through the aligned through-openings to form a bond.

7. A method for producing a film composite (1) consisting of at least one composite film (10) according to claim 1, the method comprising:
   aligning the at least two rows of through-openings of the second layer; and activating the at least one sealing layer by introducing heat and pressure, whereby the introduction of the heat and pressure causes a displacement of a material of the at least one sealing layer into a region of the aligned through-openings such that the material of the at least one sealing layer comes mutually into operative connection.

* * * * *